Figure 1:
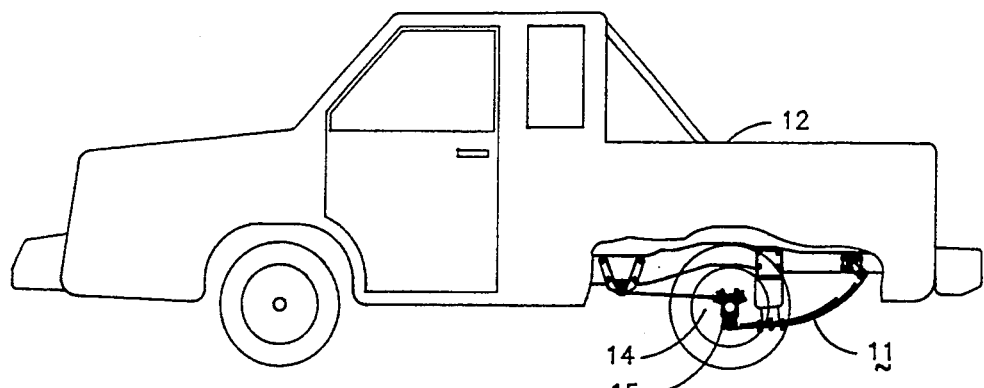

United States Patent

Hedenberg et al.

[11] Patent Number: 5,351,986
[45] Date of Patent: Oct. 4, 1994

[54] VEHICLE AIR SUSPENSION SYSTEM

[76] Inventors: William E. Hedenberg, P.O. Box 4173, Northbrook, Ill. 60062; Dennis E. Hedenberg, 1786 South Illinois St., Des Plaines, Ill. 60018

[21] Appl. No.: 45,778
[22] Filed: Apr. 14, 1993
[51] Int. Cl.$^5$ ............................................. B60G 11/34
[52] U.S. Cl. ................................... 280/712; 267/31
[58] Field of Search ........... 280/711, 712, 718, 713, 280/703; 267/31, 229, 241, 32

[56] References Cited

U.S. PATENT DOCUMENTS

| | | | |
|---|---|---|---|
| 3,174,771 | 3/1965 | Müller | 280/718 |
| 3,462,169 | 8/1969 | Carter | 280/718 |
| 4,033,609 | 7/1977 | Malcolm | 280/718 |
| 4,379,572 | 4/1983 | Hedenberg | 280/711 |
| 4,518,171 | 5/1985 | Hedenberg | 280/711 |

FOREIGN PATENT DOCUMENTS 57-44507  3/1982  Japan ................................. 280/718

Primary Examiner—Karin L. Tyson
Attorney, Agent, or Firm—Leo J. Aubel

[57] ABSTRACT

An air suspension system for a vehicle such as a pick-up truck, wherein an air spring is mounted directly on the leaf spring of the vehicle and the air spring and leaf spring support the weight of the vehicle frame and load, effectively in series. The combination of the air spring and leaf spring provides a reduction in ride vibration whereby the vehicle rides as smoothly when it is unloaded as when it is carrying a load.

6 Claims, 2 Drawing Sheets

VEHICLE AIR SUSPENSION SYSTEM

BACKGROUND OF INVENTION

The present invention relates to an air suspension systems applicable or useful for vehicles, particularly for trucks and automobiles. The invention relates to and is and improvement over U.S. Pat. Nos. 4,379,572 and 4,518,171 both issued to William E. Hedenberg, the inventor of the present invention.

U.S. Pat. No. 4,379,572 provided an air suspension system which could be relied on as a primary means for supporting the load carried by the vehicle and for absorbing the forces imparted by the road to the vehicle through the wheels and axle of the vehicle. The system of U.S. Pat. No. 4,379,572 permitted convenient location of that suspension system vertically and horizontally with respect to the vehicle axles while allowing the system to be mounted on most types of frames and on most types of vehicles.

The air suspension systems disclosed in U.S. Pat. No. 4,379,572 functioned satisfactorily, however, the installation of that air suspension system on a vehicle required the removal of a number components and brackets included on the vehicle by the original manufacturer of the vehicle. Also, it was found that the installation was difficult and time consuming. Further, certain improvements in techniques, mounting and operation have been found which improve the performance of air suspension systems.

SUMMARY OF THE INVENTION

The invention relates to an air suspension system which comprising improved, simplified and uniquely mounted apparatus which includes means for improving the ride and stability of the vehicles; and, for maintaining the level of the vehicle during acceleration and deceleration, respectively.

The foregoing features and advantages of the present invention will be apparent from the following more particular description of the invention. The accompanying drawings, listed hereinbelow, are useful in explaining the invention.

DRAWINGS

Figure 2:
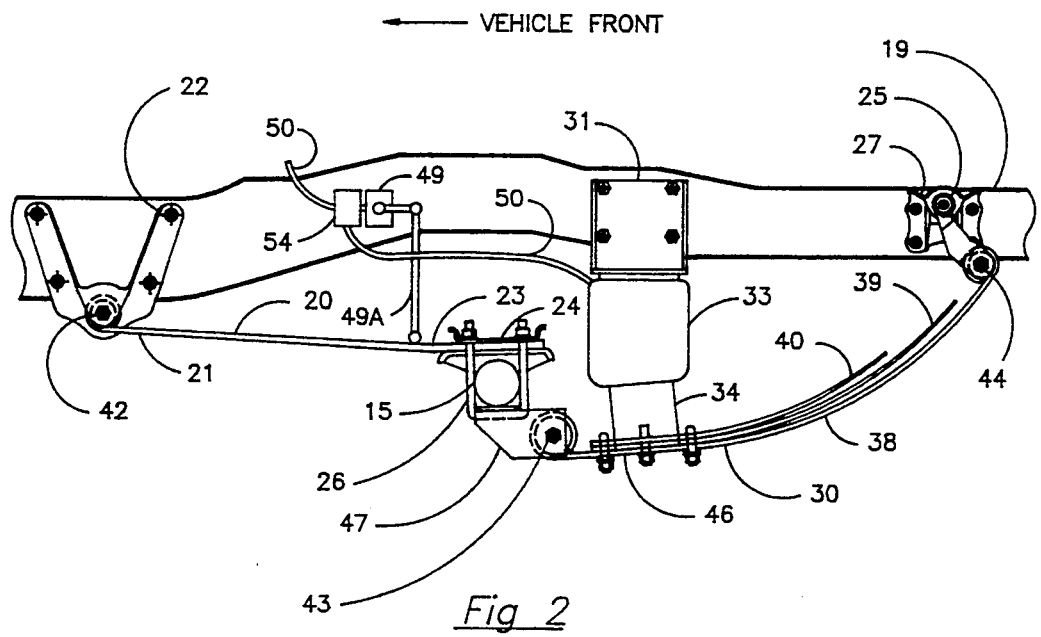
Figure 3:
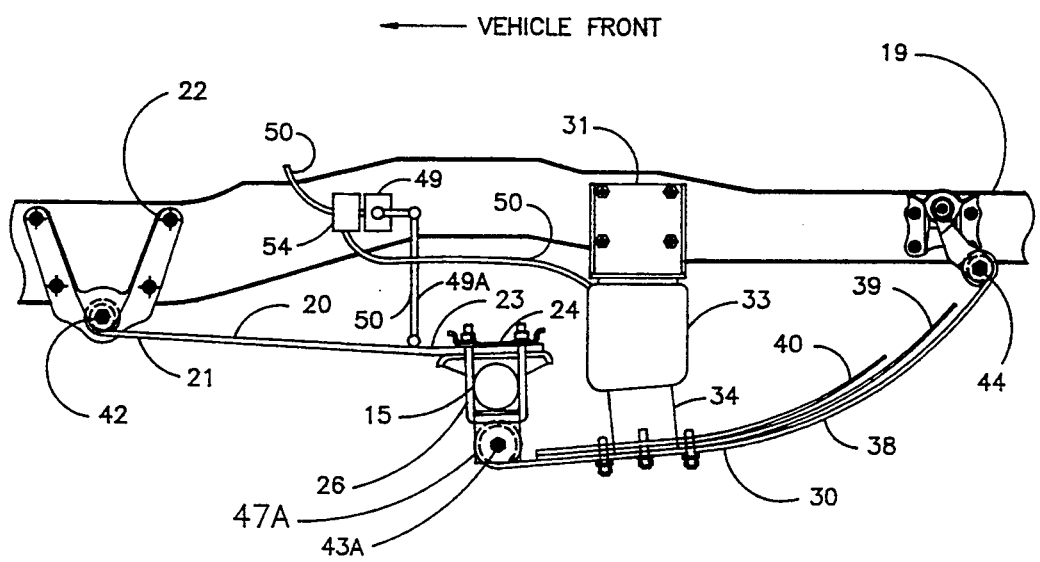
Figure 4:
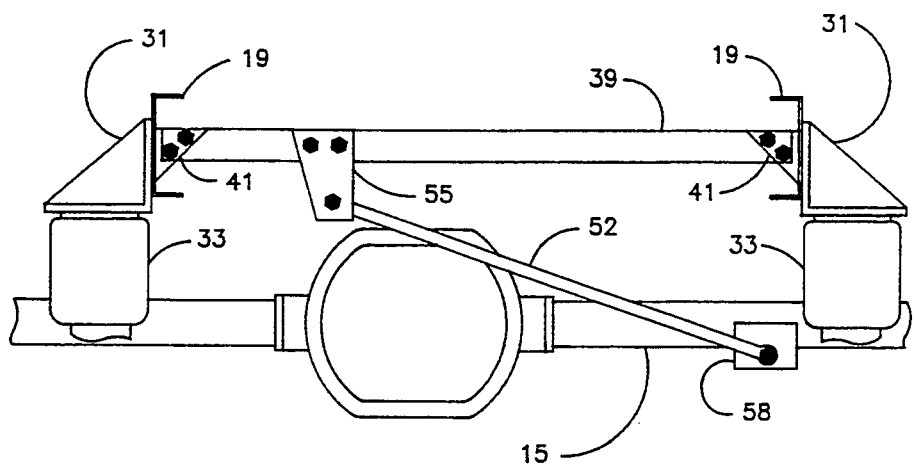
Figure 5:
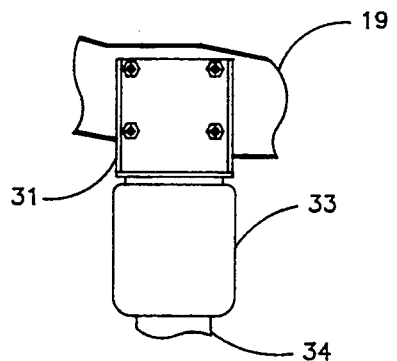
Figure 6:
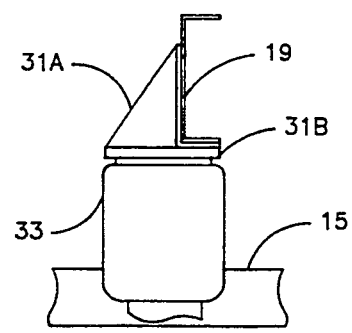
Figure 7:
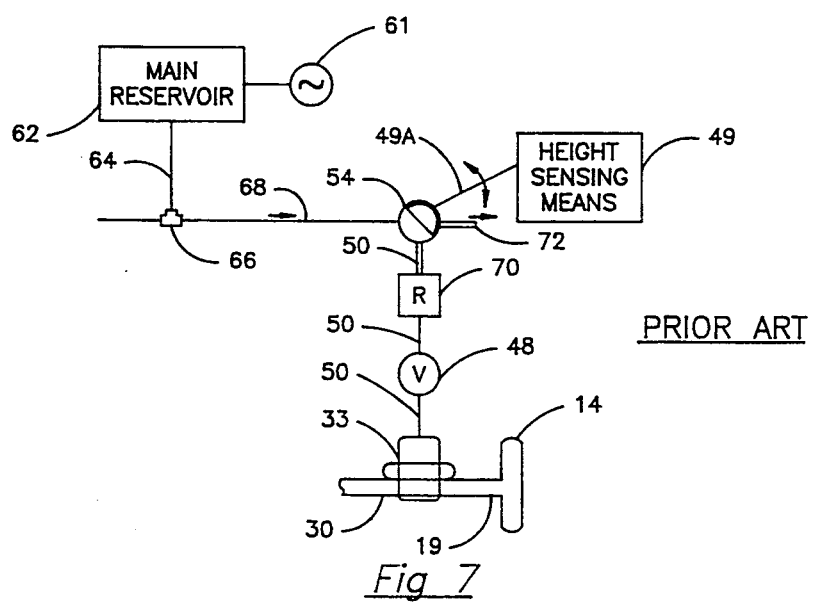

FIG. 1 shows a side view of a vehicle having the present invention installed thereon, FIG. 2 shows a side view of a first embodiment of the inventive system, FIG. 3 shows a side view of a second embodiment of the inventive system, FIG. 4 is a rear view of a portion of the axle of a vehicle showing the mounting of an inventive system on the left and right ends of the axle, FIG. 5 shows a view of one type of bracket for mounting the air spring of the inventive system, FIG. 6 shows a view of a second type of bracket for mounting the air spring, and FIG. 7 is a sketch showing the concept of the height sensing and adjusting means of the prior art utilized in connection with the present invention.

DESCRIPTION OF INVENTION

FIG. 1 shows an air suspension system 11, as generally disclosed herein, installed on a pick-up truck vehicle 12. More specifically, the inventive air suspension system 11 is shown as installed adjacent the left rear wheel 14 on the rear axle (axle housing) 15 of the truck 12. As may be obvious, a pair of inventive air suspension systems 11 are mounted on the vehicle, one on the left end and one on the right end of the vehicle axle housing 15 (see also FIG. 4). U.S. Pat. No. 4,379,572 has been discussed hereinabove. Note that the inventive air suspension system 11, as shown in FIG. 1 is positioned differently from the positioning of the suspension system disclosed in said patent, and while various components of the inventive system 11 appear similar to those of that patent, the concepts, mounting and operation of the two systems are distinct and different, as will become clear.

FIG. 1 is illustrative of one practical application or installation of the inventive air suspension system 11 on a pick-up truck 12, however the system 11 may also be used effectively on automobiles, recreational vehicles, and vans etc. The system 11 is installed in what is termed a "trailing lever arm" position in that the air spring and leaf spring support area rearwardly of the rear axle 15 of truck 12, as will be explained.

FIG. 2 shows the left rear portion of frame 19 of the vehicle and the end of the axle housing 15. An elongated member 20, which may a pre-fabricated monoleaf spring, a solid beam, or a cut off portion of the leaf spring of the vehicle as it comes off of the assembly line, is affixed to the frame 19. Member 20 becomes, or functions, as a new forward assembly "pusher torque rod or arm". The forward end 21 of pusher torque rod member 20 is attached, as by suitable bolts, to a forward spring hanger bracket 22 to form a forward pivot point 42 for pusher torque rod 20. Bracket 22 normally comes with the vehicle as originally manufactured. The aft or rear end 23 of pusher torque rod 20 is clamped to the axle housing 15 by a suitable plate support 24 and square U-bolts 26. Plate support 24 may also be part of the original equipment, or a fabricated plate support.

A unique leaf spring assembly 30 with a pivot at each end, functions as a lever trailing arm. In the embodiment shown, the leaf spring assembly 30 comprises several individual leafs, three such leafs 38, 39 and 40 being used in a preferred embodiment- (The leaf spring assembly may comprise more or less leafs.) Leaf spring 38 is the longest and main leaf, and is positioned as the bottom of the leaf spring assembly 30; leaf 39 is the second longest leaf and is positioned as the middle leaf; and, leaf 40 is the shortest leaf and is positioned as the top leaf. The forward ends of the three leafs 38, 39 and 40 are bolted together by a suitable bracket and bolt assembly 46 and to the support plate for the base 34 of an air suspension spring 33, to be described below. Note that the rear ends of leafs 39 and 40 are not constrained.

The forward end of leaf spring 38, which is suitably looped (as is known), is connected by a suitable bolt and rubber bushing to a lever trailing arm bracket 47. Bracket 47 is in turn mounted by known U-bolts 26 to the axle housing 15 of the truck 12. Note, that in the embodiment of FIG. 2, the end of the spring assembly 30 is mounted on bracket 47 at a point or position to the rear or behind and below the axle 15. The connection of leaf spring 38 of spring assembly 30 to bracket 47 forms a forward pivot 43 for the air spring assembly 30.

As will be described more fully hereinbelow, there is an advantageous feature of moving the pivot 43 toward the back of the vehicle 12 since it allows placement of the air spring 33 closer to the pivot 43 which results in lowering the lifting ratio of the air spring 33. Secondly, by placing the trailing arm pivot 43 slightly to rear of the axle 15, additional lifting action is transmitted to the forward pusher torque rod 20, as will be explained.

The rear end (suitably looped) of leaf spring 38 is attached to a suitable shackle 25 and a rear spring hanger bracket 27, and forms a rear pivot 44 for leaf spring assembly 30. Shackle 25 and bracket 27 may both be normally provided with the original equipment of truck 12.

The air suspension spring 33, which may be of suitable know manufacture is mounted by suitable bolts to a support bracket 31 which extends outwardly from the frame 19 and is affixed to the frame as by suitable bolts or fasteners. The base 34 of air spring 33 rests on, and is affixed by suitable plates, bolts or fasteners to be in contact with the leaf spring lever trailing arm assembly 30.

Refer now also to FIG. 4, it has been found that when the air spring assemblies 33 are attached to the outboard side of the vehicle frame 19 as by outwardly extending support brackets 31 the frame may be susceptible to flexing and twisting. FIG. 5 shows the support bracket 31 mounted on the outboard side of the frame 19. Accordingly, to avoid any tendency toward twisting, a cross member 39 is attached by bracket and bolt assemblies 41 to the vehicle frame 19 adjacent the support brackets 31 for each of the air springs 33.

As shown in FIG. 6, in a second embodiment, and dependent on the positioning of other components on the truck 12 the mounting bracket 31A for the air suspension spring 30 can be configured to have a portion 31B which extends slightly under the vehicle frame 19 to provide an L-shaped and somewhat more rigid support.

Refer back to FIG. 2. The pusher torque rod 20, described above, has its forward end 21 affixed to bracket 22 by a suitable bolt and bushing to form forward pivot 42; and, the rear end of pusher torque rod 20 is solidly clamped to axle housing 15 by plate 24 and U bolts 26. As the name implies, pusher torque rod 20 functions as a torque preventing element which prevents axle wind or torquing of axle 15. Pusher torque rod 20 also functions as a pusher rod which tends to push the frame 19 forward. It has been found that as the axle 15 tends to twist or wind, the forces that are induced into the forward torque rod 20 push and attempt to lift the vehicle frame, and the forgoing action has the effect of preventing vehicle rear end sag or depression on acceleration. The pusher torque rod 20 functions in a reverse mode or reverse action, when the truck 12 is being braked as for stopping or slowing down. To state the function in another way, upon acceleration, forces are applied to the bracket or hanger 22 through the pusher torque rod 20 which provide vertical components of force in an upward direction which counteracts the lowering tendency of the rear of the frame 19. Upon braking, forces are applied to the bracket or hanger 22 through the pusher torque rod 20 which provide vertical components of force in a downward direction which counteracts the rising tendency of the rear of the frame 19.

The foregoing features of the inventive system 11 also provide better traction on acceleration and deceleration. As will be appreciated, a smoother ride will also result. Further, the truck 12 is susceptible to less stresses and has a longer operating life span.

In the inventive system 11, the overall configuration of the leaf spring assembly 30 comprising the lever trailing arm is relatively small, weighs less, fits on the frame 19 well, and mounts into existing shackles and hangers 22 and 27. Also the overall leaf spring assembly 30 is shorter; and, no heavy beam, as in the prior art, is required.

It will be appreciated that the inventive air suspension system is a direct acting system; that is, the air spring 33 is supported on and acts on the leaf spring assembly 30 itself. Virtually all the weight of the truck 12 is effectively on the air spring 33; and, the air spring 33 is effectively in series with the lever trailing arm formed by leaf spring assembly 30. This is clearly shown in FIGS. 2 and 3, wherein the weight of the truck 12 is effective on the air spring 33 which in turn, has its base supported by the leaf spring assembly 30 forming the lever trailing arm.

Placing the air spring 33 on the leaf spring assembly 30 provides a totally flexible configuration; and, the flexibility of the leaf spring 30 reduces the tendency to induce vibration from the wheels and axle 15 into the chassis or frame 19; that is, the leaf spring lever trailing arm 30 dampens vibration.

The air spring 33 over leaf spring assembly 30 configuration of the inventive system 11 makes the truck 12 ride as smoothly unloaded as it does with a load because each individual leaf 38, 39 and 40 progressively and additively enter into a load bearing action as the load on the vehicle is increased. That is, as the load is increased, more of the leafs, that is leafs 39 and 40 become effective.

Thus the present invention provides a progressive type of suspension support or function. For example, when the truck 12 is unloaded only the main leaf 38 under load and the inventive system 11 provides a lower frequency ride. In such case, the spring assembly 30 is not as stiff while still providing support. When the truck 12 is unloaded the inventive system provides a ride about as smooth as riding in a passenger automobile. This is in contrast to the prior art which provides a relatively stiff ride.

In the loaded condition, the inventive system 11 increases the load carrying capabilities of the truck 12 and also maintains the height and level of the truck 12. The inventive system 11 also prevents rear end sag and fish tailing of the truck 12.

Refer now to FIG. 3 which shows a second embodiment of the invention. The embodiment of FIG. 3 is essentially the same as that of FIG. 2 2, with the exception that in FIG. 3 the forward end of the leaf spring assembly 30A is formed to be mounted to a bracket 47A which connects to the leaf spring assembly 30A at a point immediately beneath the axle 15; and, hence the pivot point 43 is vertically in line, or immediately below and beneath the axle 15.

Thus, the inventive system 11 provides a pivot point (pivot point 43 in FIG. 2 and pivot point 43A in FIG. 3) adjacent to the axle 15, which pivot point may be selected, to thereby provide a desired lifting ratio. Note that in FIG. 2, the weight of the truck 12 and its load is carried by, and distributed at, three pivot points 42, 43 and 44. In FIG. 3, the weight and load are carried at two pivot points 43 and 44.

As shown in FIGS. 2 and 3 the point of attachment of the leaf spring 30 to the axle 15, or the intermediate pivot, 43 or 43A, can be selected to be immediately below the axle 15 to a point slightly to the rear of axle 15. The preferable range at which the pivot point or point of attachment can be angled backward is between zero degrees (0%) and ninety degrees (90%). In addition to providing a forward pushing force, the pivoting action of the intermediate pivot also allows the axle 15 to articulate up and down easier and more freely.

In contrast, in known prior art, the air springs rest or are supported on rigid base supports and the axle does not articulate up and down as freely; further in the prior art there appear to be no pivot points, as in the present invention, and hence there is no levering action.

The inventive air suspension system of FIG. 2 provides a cantilever arrangement which has a lifting ratio of 1.37, which constitutes a virtually 100 percent air ride. This is in contrast to known cantilever systems which have an average lifting ratio on the air spring of approximately 60 percent.

FIG. 7 shows a sketch of the vehicle level adjusting system including a height sensing means 49, an air compressor 61, a main air reservoir 62, a tee fitting 66 air line 68, and an air control valve 54 which is actuable by the height sensing means 49 to control the air pressure on the air suspension spring 33 through a small reservoir 70 and an air control valve 48. As clearly labeled in FIG. 7, the air control means of the inventive system 11 is well known in the prior art. The prior art sketch of FIG. 7 is essentially copied from U.S. Pat. No. 4,518,171 issued to William E. Hedenberg, the named inventor herein. The description of the prior art system of FIG. 7 as contained in said U.S. Pat. No. 4,158,171 is incorporated herein by specific reference thereto. In the present system, the reservoir 70 and valve 48 are not used because of the lower frequency response of the present system 11. Note also that the system of shown in FIG. 7 was prior art at the time of filing the application which resulted in said U.S. Pat. No. 4,158,171.

It should of course be obvious that two air suspension systems are normally used with each vehicle; that is, two inventive air suspension systems 11 are normally provided to be mounted on the rear axle housing 15 of the truck 12, one system being mounted adjacent to the left rear wheel and system being mounted adjacent to the right rear wheel. It has been found that two air suspension systems 11 can be conveniently installed on a vehicle in six man hours; that is, as compared with a time of sixteen man hours required to install the air suspension system of U.S. Pat. No. 4,379,572. In addition to various other factors, an important reason for the reduction in installation time is the fact that the inventive system 11 can be mounted on brackets and supports on the truck 12 as it is manufactured, thereby eliminating the drilling of holes and the welding of various components to the frame 19 and axle housing 15.

While the invention has been particularly shown and described with reference to a preferred embodiment thereof, it will be understood by those skilled in the art, that various changes in form and detail can be made therein without departing from the spirit and scope of the invention.

We claim:

1. A rear axle air suspension system including a rear axle for a vehicle, said vehicle having a frame, a front axle, an axle housing for said front axle and wheels mounted at opposite ends of said axle,
    a) said rear axle air suspension system being mountable adjacent each wheel on said rear axle for absorbing forces imparted to said wheels and said axle such as during movement of said vehicle on a roadway,
    b) said air suspension system extending transverse to said rear axle and including a rear axle housing,
    c) a pusher torque rod extending forward of said rear axle and means for pivotally mounting the forward end of said pusher torgue rod to said frame,
    d) means for rigidly affixing the rear end of said pusher torque rod to said rear axle housing at a point above said rear axle housing,
    e) elongated leaf spring means extending rearwardly of said rear axle and means for pivotally mounting the rear end of said leaf spring means to said frame,
    f) means for pivotally mounting the forward end of said leaf spring means to said rear axle housing at a point beneath said axle housing, and
    g) an air spring means mounted on said leaf spring means to be effective in a relative vertical direction between said leaf spring means and said frame, whereby said air spring and said leaf spring are effectively supporting said frame and loads thereon in series.

2. An air suspension system as in claim 1 wherein the air spring means is mounted rearwardly of said rear axle.

3. An air suspension system as in claim 1 wherein said air spring means has its upper portion affixed to said frame, and wherein said air spring means has its lower or base portion supported on said leaf spring means.

4. An air suspension system as in claim 1 wherein said leaf spring means has its forward end affixed to the rear of the point at which said pusher torque rod is affixed to said axle housing.

5. An air suspension system as in claim 4 wherein said leaf spring means is affixed below and to the rear of the point at which said pusher torque rod is affixed to said axle housing.

6. An air suspension system as in claim 1 wherein said leaf spring means comprise multiple separate leafs of unequal length with the shortest leaf being positioned on top of the assembly, and the longest leaf being positioned at the bottom of the assembly, said multiple leafs being affixed together to support said air spring means, the lower leaf being pivotally mounted at its forward end to said axle housing and at its rear end being pivotally mounted to said frame, and the rear ends of said other leafs being not constrained.

\* \* \* \* \*